(12) United States Patent
Fuertges

(10) Patent No.: US 7,075,449 B2
(45) Date of Patent: Jul. 11, 2006

(54) VEHICLE OCCUPANT SENSOR SYSTEM

(75) Inventor: Matthias W. G. Fuertges, Kitchener (CA)

(73) Assignee: Woodbridge Foam Corporation (CA)

( * ) Notice: Subject to any disclaimer, the term of this patent is extended or adjusted under 35 U.S.C. 154(b) by 182 days.

(21) Appl. No.: 10/733,769

(22) Filed: Dec. 12, 2003

(65) Prior Publication Data

US 2004/0212513 A1  Oct. 28, 2004

Related U.S. Application Data

(60) Provisional application No. 60/432,978, filed on Dec. 13, 2002.

(51) Int. Cl.
*G08B 21/00* (2006.01)

(52) U.S. Cl. .................................. 340/666; 340/667
(58) Field of Classification Search ............... 340/666, 340/665, 667; 200/85 R, 85 A
See application file for complete search history.

(56) References Cited

U.S. PATENT DOCUMENTS

| | | | |
|---|---|---|---|
| 5,047,602 A * | 9/1991 | Lipka | 200/86 R |
| 5,798,703 A * | 8/1998 | Sakai et al. | 340/666 |
| 5,895,900 A * | 4/1999 | Okada et al. | 200/85 R |
| 6,348,663 B1 * | 2/2002 | Schoos et al. | 177/144 |
| 6,737,953 B1 * | 5/2004 | Serban et al. | 338/2 |
| 6,831,565 B1 * | 12/2004 | Wanami et al. | 340/667 |

* cited by examiner

*Primary Examiner*—John Tweel, Jr.
(74) *Attorney, Agent, or Firm*—Katten Muchin Rosenman LLP

(57) ABSTRACT

The present invention is a sensor element, particularly a sensor element useful in a vehicle occupant detection system. The sensor element comprises a first conductor and a second conductor disposed transversely with respect to one another to define a junction. In use, when a constant voltage is applied to the conductors, a first conductance is produced in the absence of applied weight to sensor element and a second conductance is produced in the presence of applied weight to the sensor element wherein the second conductance being greater than the first conductance. By incorporating a number of such junctions into matrix arrangement, the present sensor can be advantageously employed in a vehicle occupant detection system. This allows for the creation of a spreadsheet-like environment where interrogation of each matrix cell provides information about the acting force. Since it is possible to identify the location of the given cell in an overall matrix, it is possible to pinpoint the position of the acting force or pressure. The combination of information on each cell can be recognized as one or more patterns. A centroid for such patterns can be readily calculated (i.e., based on interrogating the matrix for the conductance difference referred to above) and the prediction of the position of the occupant in the vehicle seat can be deduced.

25 Claims, 14 Drawing Sheets

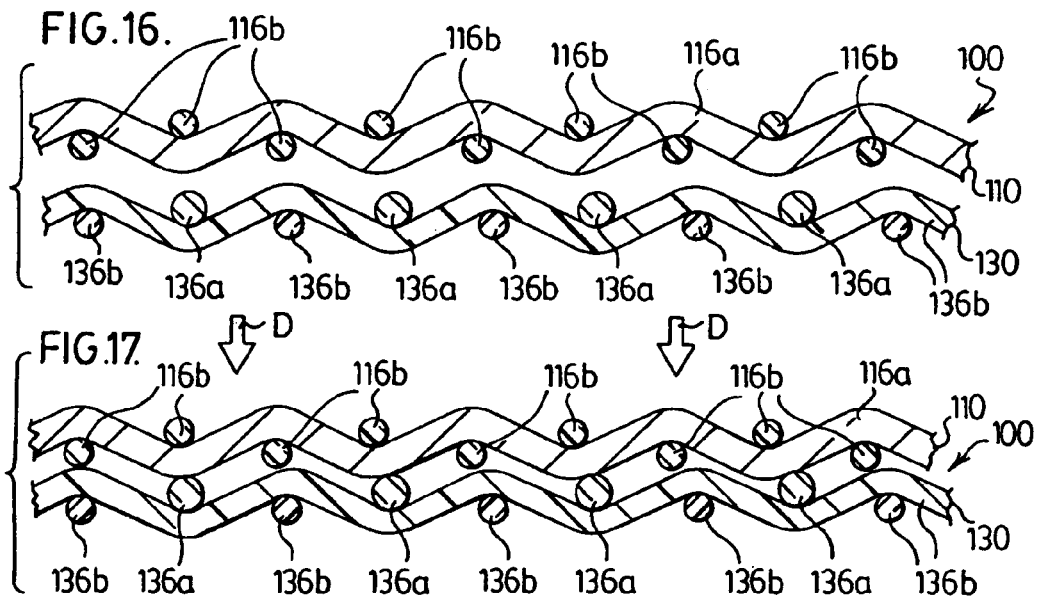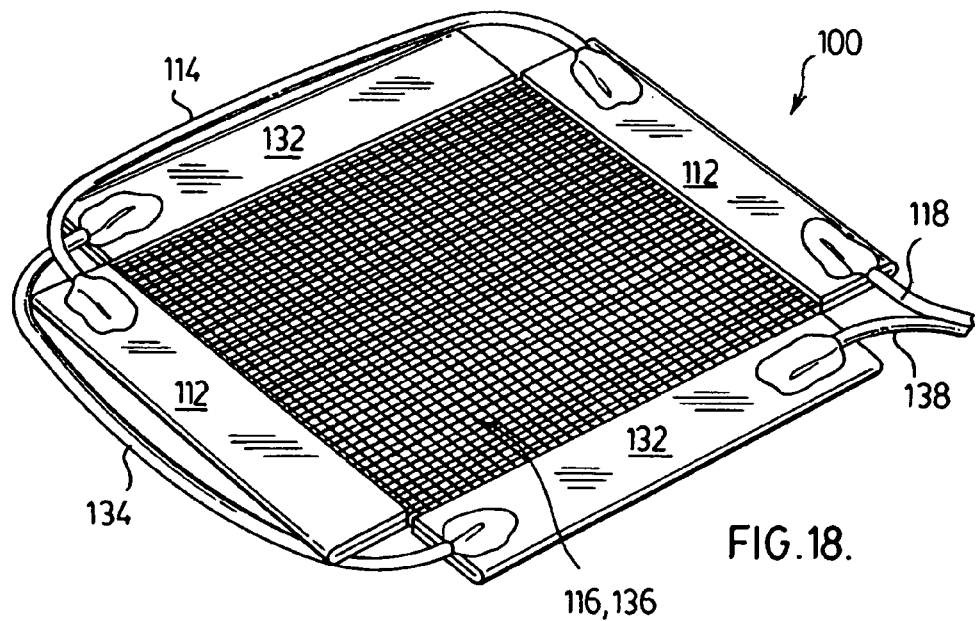

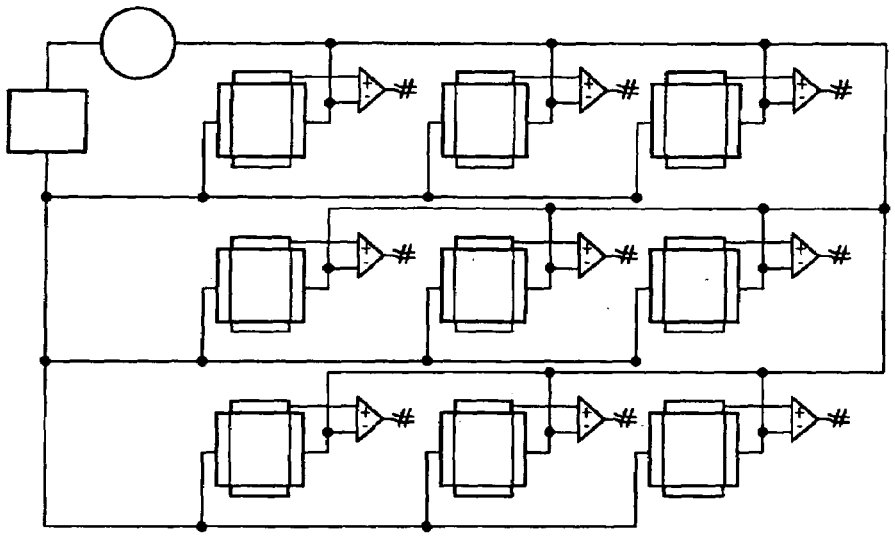
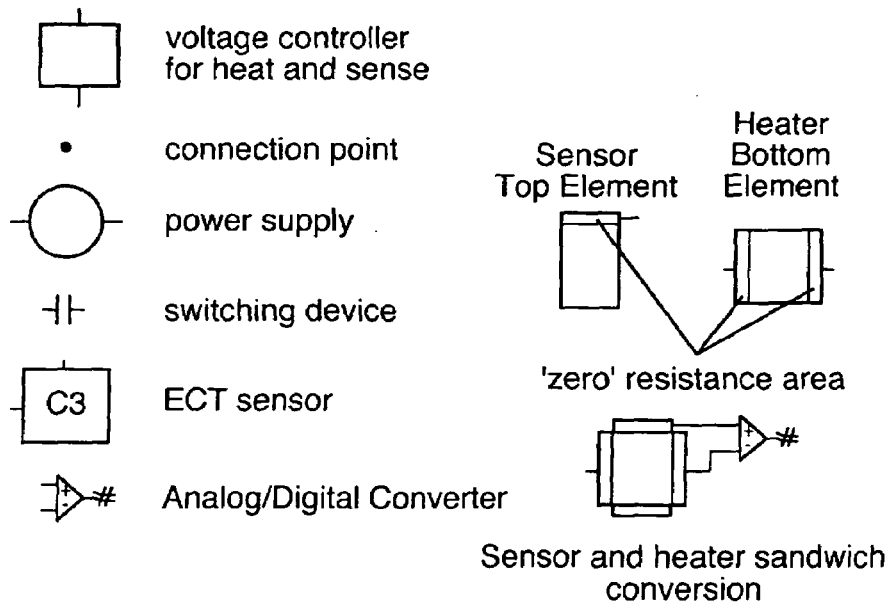
FIG.23

VEHICLE OCCUPANT SENSOR SYSTEM

CROSS-REFERENCE TO RELATED APPLICATION

The present application claims the benefit under 35 U.S.C. §119(e) of provisional patent application Ser. No. 60/432,978, filed Dec. 13, 2002, the contents of which are hereby incorporated by reference.

BACKGROUND OF THE INVENTION

1. Field of the Invention

In one of its aspects, the present invention relates to a sensor element, particularly for use of vehicular occupant detection system. In another of its aspects, the invention relates to a vehicular occupant detection system.

2. Description of the Prior Art

In recent years, the use of supplementary restraint systems (SRS) such as airbags has become widespread in the automotive industry.

Thus, it is now conventional (and in some jurisdictions mandated) to utilize an airbag-based SRS. Indeed, such systems now utilize airbags which may be deployed from one or more of the dashboard, the A-pillar, the headliner and the like.

While the advent of SRS has, to some degree, revolutionized the automotive industry, there is still room for improvement.

Specifically, as has been widely reported, there can be situations where it is not appropriate for the airbag to fully deploy or deploy at all. Thus, if the occupant in the vehicle seat is a small child, a pregnant woman or a "regular" occupant who is leaning forward, full deployment of the airbag can sometimes lead to unintended (and potential fatal) consequences.

Thus, in recent years, much work has centered on the development on so-called vehicle occupant detection systems which operate generally by providing more information about the occupant in the vehicle seat (e.g., occupant weight, occupant position and the like) and utilize this information to control deployment of the airbag and, in some cases, to disengage deployment of the airbag entirely.

One body of this work relates to the use of strain gauges and the like incorporated in the frame and/or seat pan of the vehicle seat to measure a change in weight when an occupant is seated. While determining the weight of the occupant is useful information, this measurement alone, in most cases, does not provide sufficient information for optimal control of the airbag deployment system.

A second body of work relates to the use of capacitance sensors to map position of the occupant. In some cases, the capacitance sensors can be combined with weight sensors such that the weight and the position of the occupant can be determined. While the use of capacitance sensors in the vehicle occupant detection system is an advance in the art, the long term effects of such a system are unknown. Specifically, it is known that, in order for a capacitance sensor to operate properly, the sensor emit a frequency field which, when interrupted by an occupant, can be detected by the sensor. In other words, whenever the occupant is seated in the vehicle under operation, that occupant will be subjected to the frequency field. Unfortunately, the long term health effects on the occupant of residing in such a field while seated in the vehicle are currently unknown and, at the very least, raises uncertainty as to the overall usefulness of such systems.

Thus, despite advances made in the art, it would be desirable to have a vehicle occupant detection system which provides the advantages of capacitance sensing system (i.e., the ability to map the position of the occupant) while avoiding the requirement for using a frequency field and any long-term health effects on a vehicle occupant residing in that field for an extend period of time.

SUMMARY OF THE INVENTION

It is an object of the present invention to obviate or mitigate at least one of the above-mentioned disadvantages of the prior art.

Accordingly, in one of its aspects, the present invention provides a sensor element comprising a first conductor and a second conductor disposed transversely with respect to the first conductor to define a first junction, wherein at a constant voltage, a first conductance is produced in the absence of applied weight to sensor element and a second conductance is produced in the presence of applied weight to the sensor element, the second conductance being greater than the first conductance.

Thus, the present inventor has discovered a novel approach for a sensor element, particularly a sensor element useful in a vehicle occupant detection system.

BRIEF DESCRIPTION OF THE DRAWINGS

FIG. 16 is a schematic cross-sectional view of the resting state of the FIG. 15 sensor.

FIG. 17 is another schematic cross-sectional view of the weight-applied state of the FIG. 15 sensor.

FIG. 18 illustrates another embodiment of the sensor according to the present invention.

FIG. 23 is a schematic circuit diagram of a further useful embodiment of the present invention.

DETAILED DESCRIPTION OF THE PREFERRED EMBODIMENTS

Figure 1:
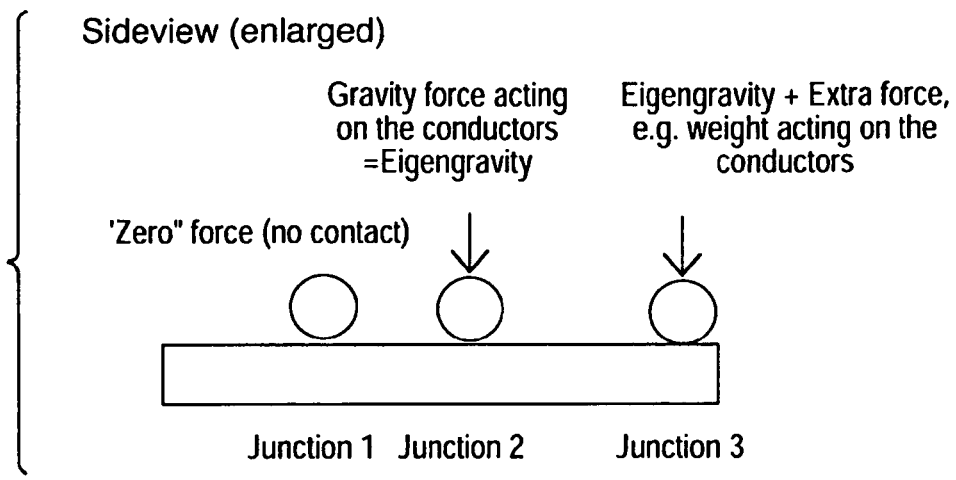
FIG. 1 illustrates an enlarged cross-sectional schematic view of an example of a first embodiment according to the present invention where each conductor comprises a round, bare electrically conductive material such as wire.
Figure 2:
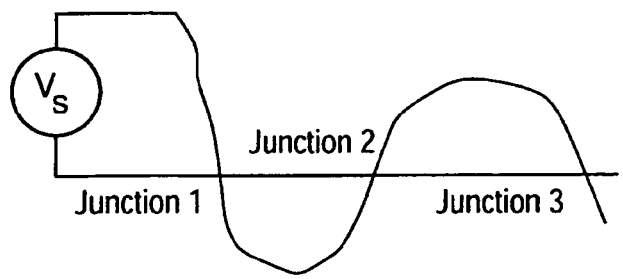
FIG. 2 illustrates a wiring diagram for the arrangement of FIG. 1.

The sensor element comprises a first conductor and a second conductor which are disposed transversely with respect to one another. FIG. 1 illustrates an enlarged cross-sectional view of an example of such an arrangement where each conductor is a round, bare electrically conductive material such as wire. FIG. 2 illustrates a wiring diagram for the arrangement of FIG. 1.

With reference to FIGS. 1 and 2, when no pressure or force is applied on the conductors, there is "zero" force (no contact)—junction 1—indicating no physical contact area but closeness between the conductors. If one accounts for the effective gravity, (e.g., the weight exerted on the area of the conductors by the physical properties), the result is shown a junction to where there is minimal contact between the two conductors.

When force or pressure (e.g., weight of an occupant) is applied to the conductors the area of contact at the junction is increased—see junction 3 in FIG. 1.

If one considers the application of an applied voltage (e.g., one volt) the current at junction 1 is zero because the area of contact between the two conductors is zero.

With regard to junction 2, the current is not zero since the two conductors are contacting each other allowing for electrons to cross from one conductor to the other conductor. This "crossing" area defined as the junction and the size of this area allows some electrons to flow across it as a function of the "driving force" of the applied voltage (e.g., one volt) and the total resistance in the circuit.

As is known to those of skill in the art, the law of electrical conductance states that the current is directly proportional to the size of the area and some material constant, and indirectly proportional to the length of the conductor. In mathematical terms:

conductance=area of the conductor*material constant/length of the conductor

The electrical unit for conductance is given in "Siemens".

Thus, for a fixed length of conductor with a constant cross-sectional area the relationship can be rewritten as follows:

conductance=area of contact*material constant

The present sensor employs this concept, and is particularly advantageous when applied to a vehicle occupant detection system.

With reference to junction 3, the current is higher at this junction than junction 2 since the added weight on the conductors presses the conductors together thereby increasing the effective area. Since the area of contact increases, the current increases, thus, there is more "conductive area" and therefore more conductance.

The foregoing discussion is illustrative of one of the concepts employed by the present sensor. If the above circuit is modified such that the bare conductor has a higher conductivity with respect to the junction area (e.g., if a lower conductivity material of a approximately 10 mm length is inserted at the junction locations, it is possible to create a sensor with an improved sensing range.

It is possible to determine the current at various junctions if conductors are "lifted", in various arrangements.

For example, no current will flow through any of the junctions if all conductors are lifted off their respective junctions (i.e., applying "zero" force or pressure). The current will only flow through junction 2 if the conductor is lifted from junction 3. The current will only flow through junction 3 if the conductor is lifted off junction 2. Currents can flow through both junction 2 and junction 3 providing "joint venture" current. This "cross talk" means that there are two junctions engaged and facilitates prediction where the forces are applied—i.e., it is possible to model where the forces are acting by modeling where the particular junctions are located in space.

Thus, summarizing the above in tabular form, it is possible to determine junction activity and the geometry of forces as follows:

| | | |
|---|---|---|
| Junction 2 "0" | & | Junction 3 "0" |
| Junction 2 "Eigengravity" | & | Junction 3 "0" |
| Junction 2 "0" | & | Junction 3 "Eigengravity + applied force" |
| Junction 2 "Eigengravity" | & | Junction 3 "Eigengravity + applied force" |

Thus, if one were to include junction 1 and cycle all junctions through three different states (e.g., "0", Eigengravity and Eigengravity+applied force), it is possible to increase the number of combinations.

By considering all three junctions to alternate through three different states the combinations increase and the joint venture current becomes more complex. If a hundred junctions are created and allow for many pressure states for each junction, the combinations and joint venture current become more complex. It is apparent that this complexity should be managed by separating the area of interest in collecting the information in a spreadsheet like format by re-establishing proper force/pressure measurements and their respective positions in space.

In a particularly preferred embodiment of the present sensor, many junctions are combined together in a small confined space—e.g., approximately a hundred junctions in a 10 mm square. This 10 mm square area can be considered as the effective contact area which maybe referred to as the "Matrix cell area". The combinations of the individual junction areas can be thought of as a "Matrix contact area" where the resulting current provides information about what happens in each discreet junction. Pressure applied to this Matrix area (e.g., by an occupant sitting on the seat incorporating the sensor) produces a current, which is proportional to the sum of all minimal area changes. The benefit of this approach is the sensor is able to sense occupant weight/pressure and position.

By connecting sub-matrices into an overall matrix the present sensor can be advantageously employed in a vehicle occupant detection system. This allows for the creation of a spreadsheet like environment where interrogation of each matrix cell provides information about the acting force. Since it is possible to identify the location of the given cell in an overall matrix, it is possible to pinpoint the position of the acting force or pressure. The combination of information on each cell can be recognized as one or more patterns. A centroid for such patterns can be readily calculated and the prediction of the occupant's position in the vehicle seat can be deduced.

The conductors used in the present sensor may be derived from a number of sources. Non-limiting examples of suitable materials include metal, carbon, semi-conductors, spray-on films and other materials which are known to be electrically conducting. A particularly preferred material for use in the present sensor is conventionally known as Electro Conductive Textile (ECT). It is also possible to use metal-based textiles and carbonized textiles to produce the present sensor. A particularly preferred material is a carbonized fabric in which all conductors are weaved in a single direction alternating with non-conductors in a different direction for separation. This construction is believed to minimize hysteresis, i.e., the fabric regains its original geometric shape more quickly after removal of the applied force (i.e., after the occupant leaves the vehicle seat or the occupant shifts his/her weight).

Figure 3:
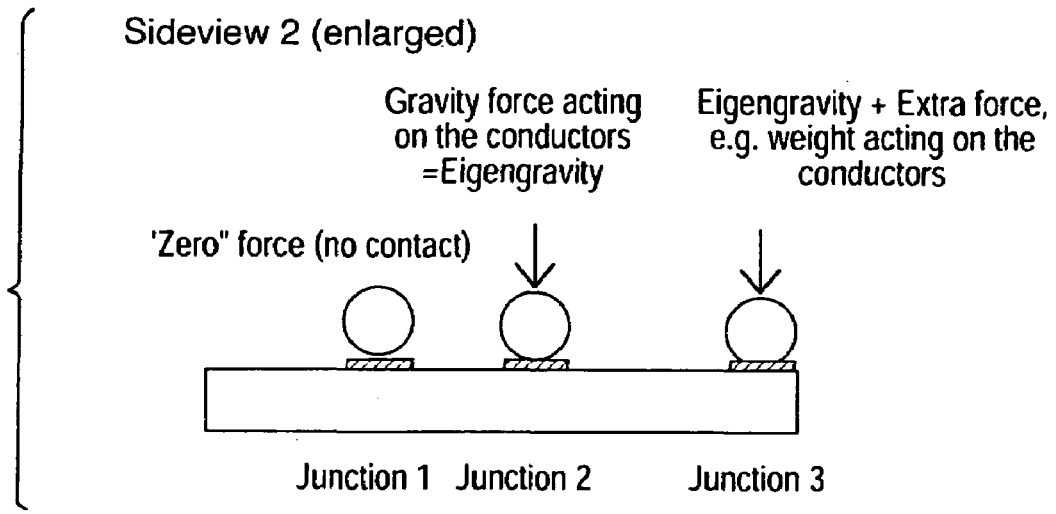
FIG. 3 illustrates an enlarged cross-sectional schematic view of an example of an in-line sandwich embodiment according to the present invention.
Figure 4:
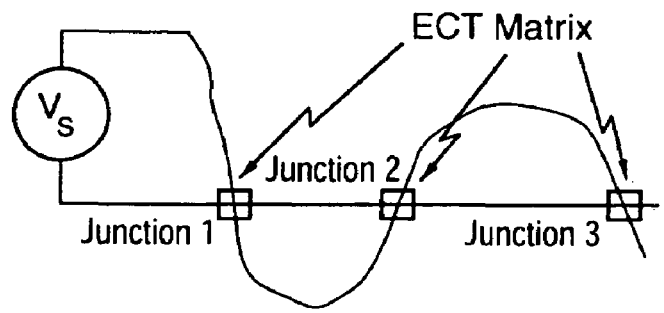
FIG. 4 illustrates a wiring diagram for the arrangement of FIG. 1.

In one embodiment of the present sensor, a so-called in-line sandwich construction is utilized. The physical construction and wiring diagram for this embodiment are shown in FIGS. 3 and 4, respectively.

In this embodiment, the conductor material is contained in a carbonized fabric in which all conductors are weaved in a single direction alternating with non-conductors weaved in a transverse direction. If one refers to the conductor material as A and the conductive matrix material as B, the junction area would be similar to a laminate structure having the form A-B-A relative to the contact area for each junction. This construction is referred to as "in-line" since the force/pressure is passed through both contacts simultaneously.

Conductor 1 touches the bottom of the matrix and conductor 2 touches the top of the matrix at junctions 2 and 3, respectively. Thus, the conductivity of the circuit is influenced by two area changes for each force change and also depends on the conductivity of the matrix itself and the individual junction areas (approximately one hundred in this embodiment as discussed above).

Even though this embodiment relates to area changes produced by pressure changes, it shows similar behaviour as load cells, where the current is proportional to any force rather than a pressure. Thus, the configuration is relatively insensitive to side loads and provides a measurement of point forces governed by the area of the conductor (in many embodiments this will be about 0.1 mm wide wire or fabric material).

Figure 5:
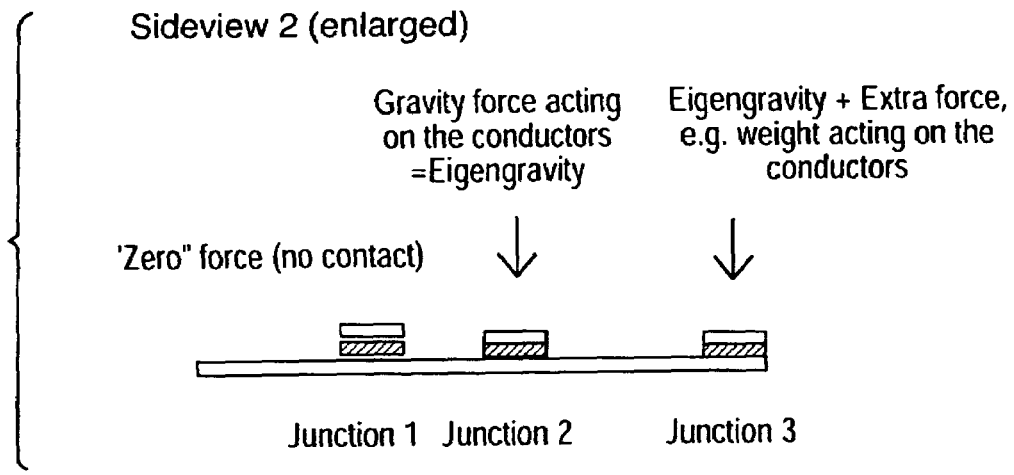
FIG. 5 illustrates an enlarged cross-sectional schematic view of an example of a modification of the in-line sandwich embodiment according to the present invention.

In a modified version of the in-line sandwich construction discussed above, it is possible to increase the area of the two conductors to the same size as the matrix area—for example, 10 mm square. This modification creates two physically equal areas between two dissimilar conductors—see FIG. 5. The effective area is thus governed by the applied forces over the area—i.e., the pressure. This embodiment provides a laminate structure of A-B-A as discussed above for the first embodiment of the in-line sandwich construction—see FIG. 5.

Thus, as above junction 1 has no conduction, junction 2 has some conduction caused by its Eigengravity and junction 3 has even more conduction than junction 2 due to the extra applied force acting on its area. Again, it is possible to measure the current proportional to the area changes between the conductors and the matrix. However, in this embodiment, the geometric area change of the conductors due to gravity and applied forces has been removed from the measurement method. Therefore, the pressure affects only the individual junction areas allowing current to flow over the small crossing areas.

Figure 6:
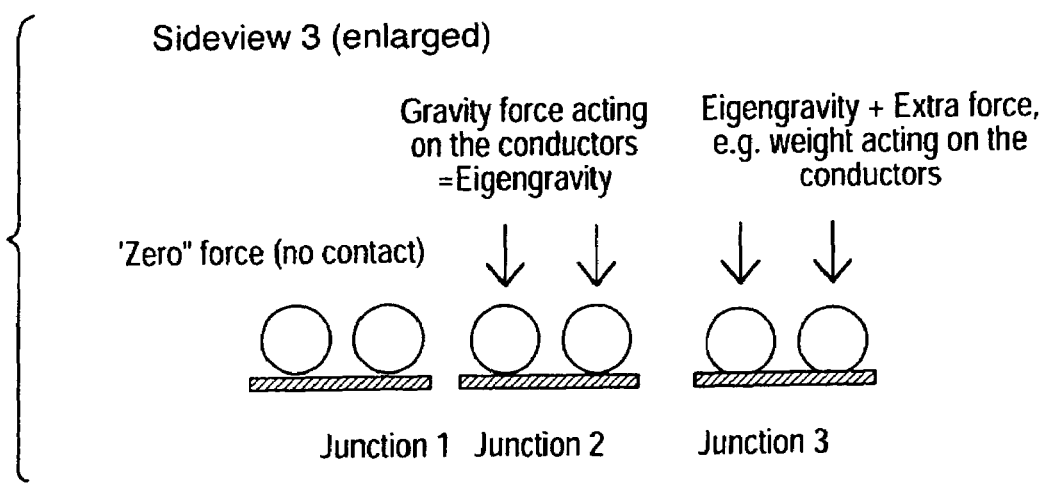
FIG. 6 illustrates an enlarged cross-sectional schematic view of an example of a bridge sandwich embodiment according to the present invention.

In a further embodiment, it is possible to employ a so-called bridge sandwich construction—this is illustrated in FIG. 6. In this embodiment, the matrix bridges the current from conductor 1 to conductor 2. This embodiment is similar to the above-discussed embodiments insofar as the contact area relationship is A-B-A.

Figure 7:
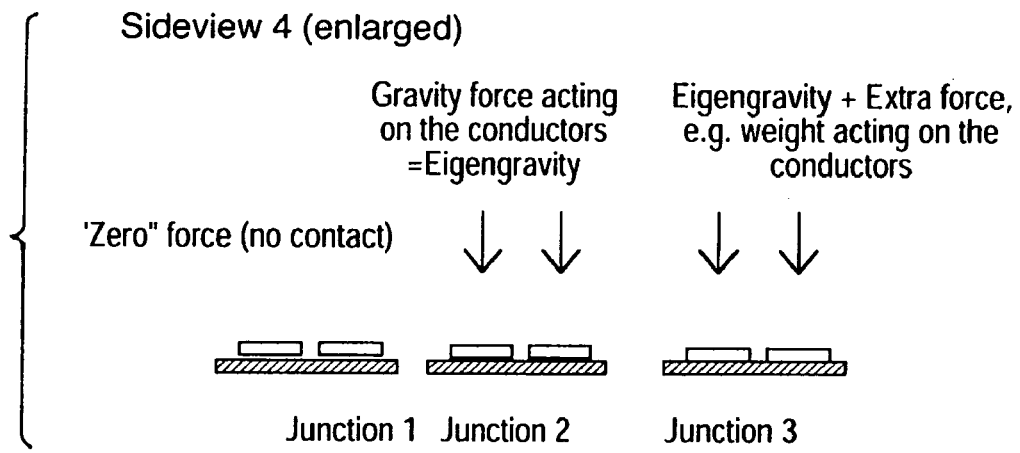
FIG. 7 illustrates an enlarged cross-sectional schematic view of an example of an alternate bridge sandwich embodiment according to the present invention.
Figure 8:
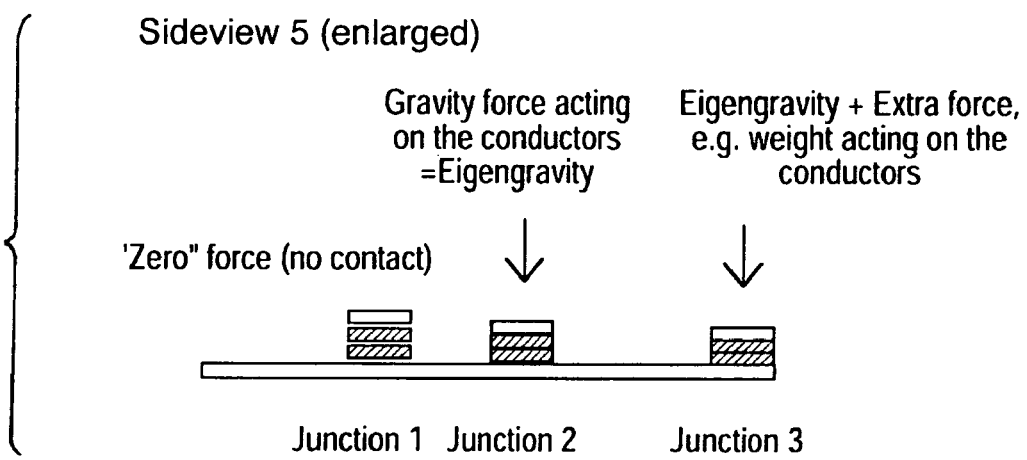
FIG. 8 illustrates an enlarged cross-sectional schematic view of an example of a modified bridge sandwich embodiment according to the present invention.

An alternate bridge sandwich construction is shown in FIG. 7 where the shape of the conductors is flat as is the conductive matrix. Again, the configuration of contacts is A-B-A but the forces are not in-line—A might have a different force than B. A further modification of the sandwich construction is illustrated in FIG. 8 wherein two matrices (or more) are arranged adjacent one another in order to provide different ranges of measurement and other characteristics. In this embodiment, the contact are relationship is: A-B-B-A in the line of applied force. It is possible to build sensors with say, ten or more matrix layers to decrease sensitivity.

As described above, the present sensor is particularly useful in a vehicle occupant detection system. The present sensor may be employed in such a system as a discreet sensor or a plurality of discreet sensors or it may be contained in a single sheet along with other sensors as will be described in more detail below.

Figure 9:
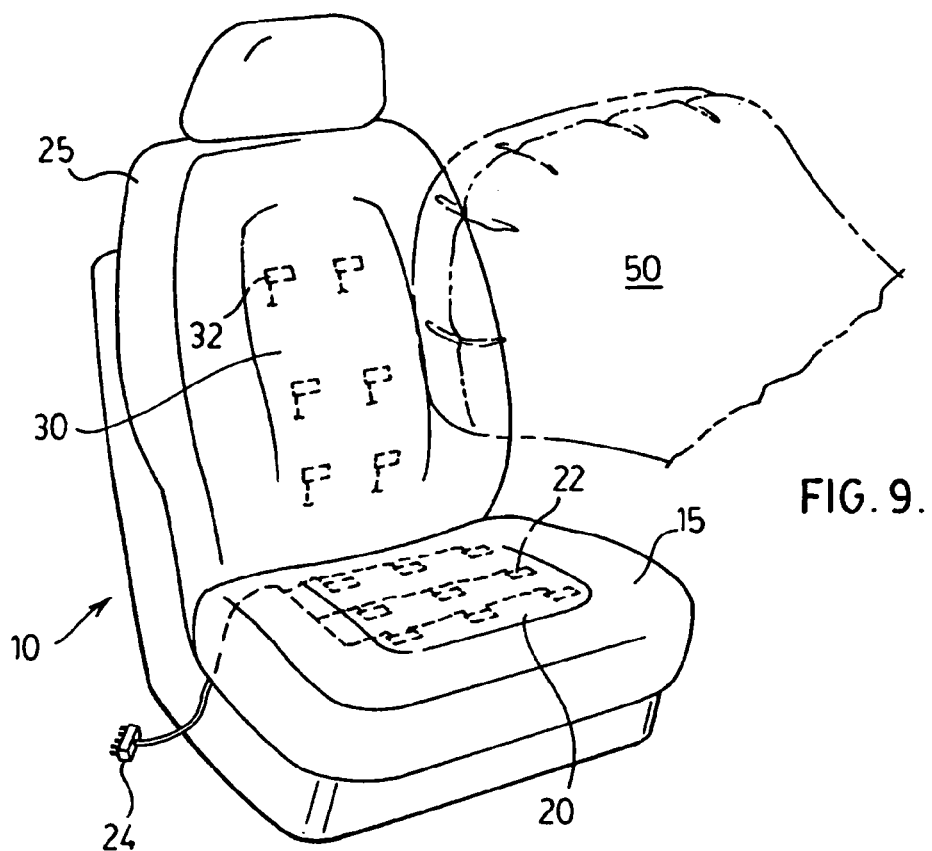
FIG. 9 illustrates a vehicular seat having sensors therein.
Figure 10:
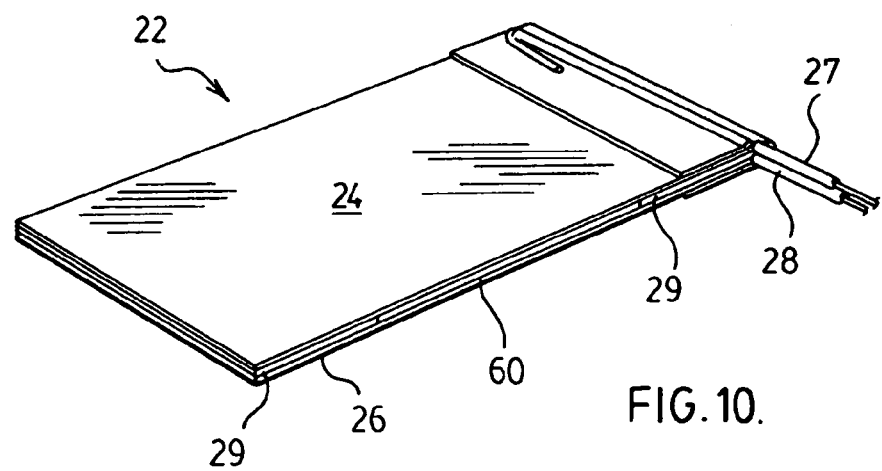
FIG. 10 illustrates a sensor according to an embodiment of the present invention.
Figure 11:
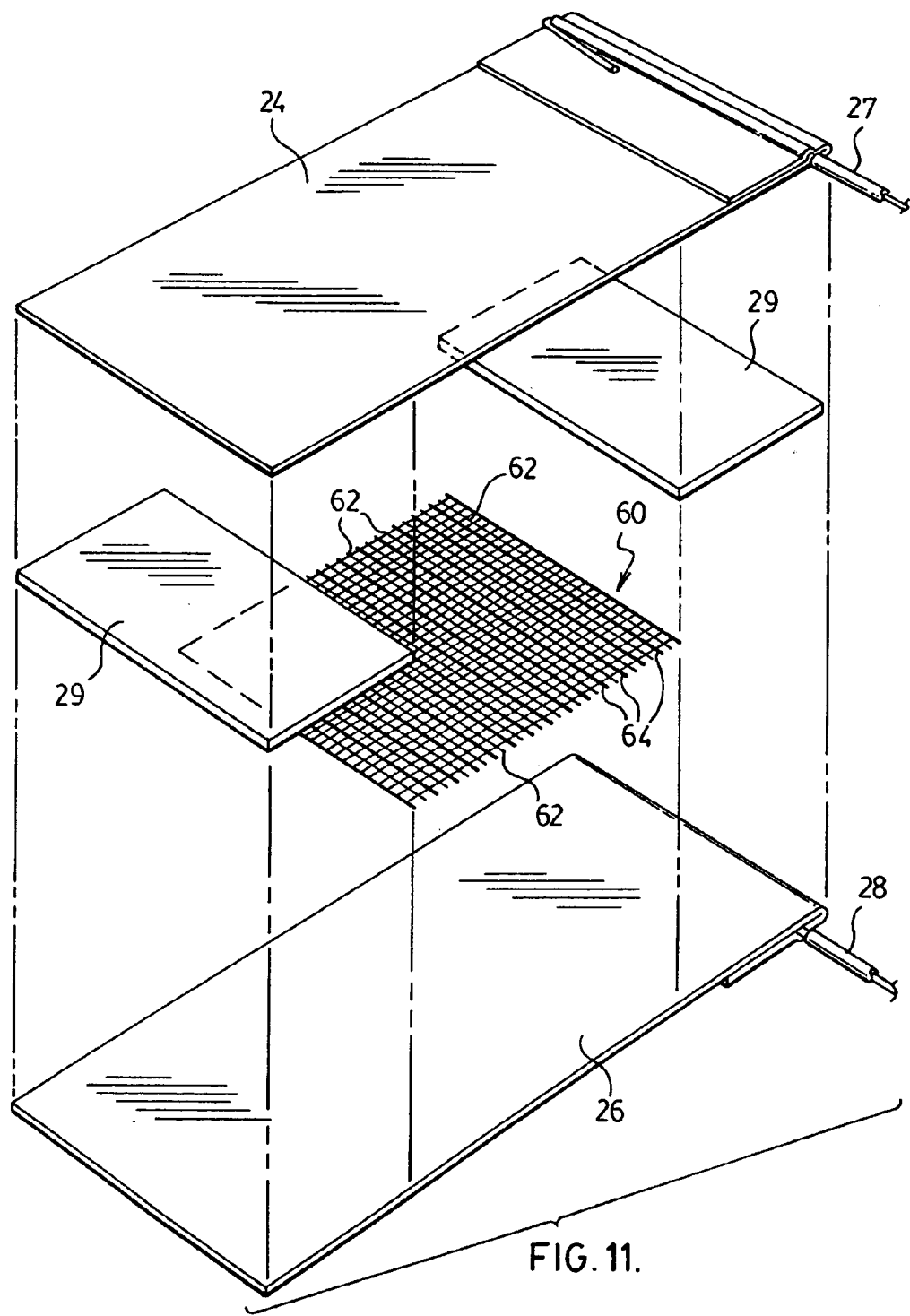
FIG. 11 illustrates an exploded view of the FIG. 10 sensor.

With reference to FIG. 9, there is illustrated a vehicular seat 10. Vehicular seat 10 comprises a seat bottom 15 having a primary seating surface 20. Vehicular seat 10 further comprises a seat back 25 having a primary seating surface 30.

Disposed in primary seating surface 20 are nine sensors 22 which are arranged generally in a 3×3 matrix pattern. Disposed in primary seating surface 30 are six sensors 32 arranged in a 2×3 matrix pattern.

Sensors 22 are individually connected to a bus 24. Sensors 32 are individually connected to a connection bus (not shown).

In the illustrated embodiment, sensors 22 and 32 have an identical construction which will be described in more detail with reference to FIGS. 10–14. As further shown in FIG. 1, vehicle seat 10 is disposed in proximity to a spot where an airbag 50 would be deployed during collision of the vehicle.

With reference to FIGS. 10–14, sensor 22 comprises a first conductive foil 24 and a second conductive foil 26. First conductive foil 24 is connected to an electrical lead 27 and second conductive foil 26 is connected to an electrical lead 28. Interposed between conductive foils 24 and 26 are a pair of electrically insulating layers 29. Also interposed between conductive foils 24 and 26 is a carbonized fabric material 60 which will be described in more detail below. Conductive foils 24 and 26 may be constructed from copper, aluminum or any other electrical conductive material. Further, the electrical conductive material may made wire, foil, solid and/or woven conductive materials.

Insulating layers 29 may be constructed from any suitable electrically non-conductive material—e.g., plastic and the like. Alternatively, insulating layers 29 may omitted if a larger portion of carbon fabric material 60 is utilized to cover, preferable over-cover, substantially the entire surface of foils 24 and 26.

With continued reference to FIGS. 10–14, carbonized fabric material 60 will be described in more detail.

As shown, carbonized fabric material 60 comprises a matrix of electrically non-conductive fibers 62. Disposed in this matrix are a number of electrically conductive fibers 64. As shown, electrically conductive fibers 64 run in a single direction through fabric 60. As can be seen, particularly with reference to FIG. 13, fabric 60 has an elastic modulus or resiliency such that it may be compressed and, once the compression force is removed, it will return to its precompressed state.

Figure 12:
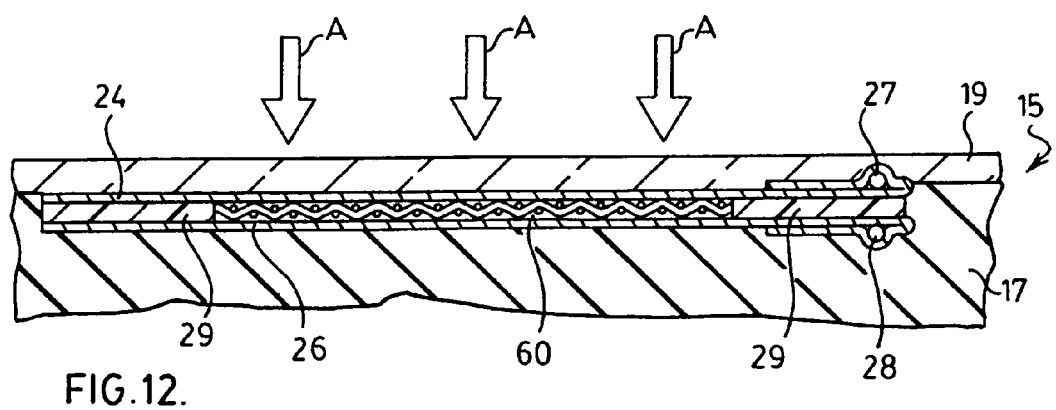
FIG. 12 illustrates the FIG. 10 sensor affixed to a seat bottom.
Figure 13:
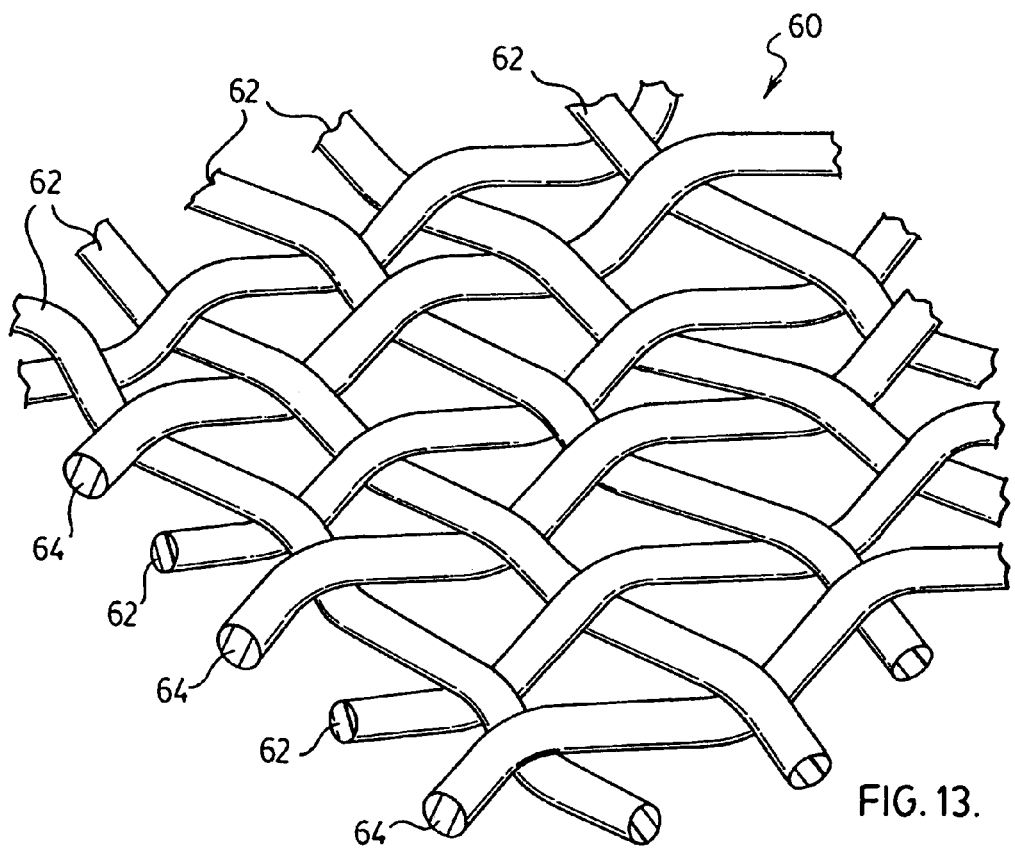
FIG. 13 illustrates a schematic perspective view of the electrically conductive fibers and non-electrically conductive fibers according to an embodiment of the present invention.
Figure 14:
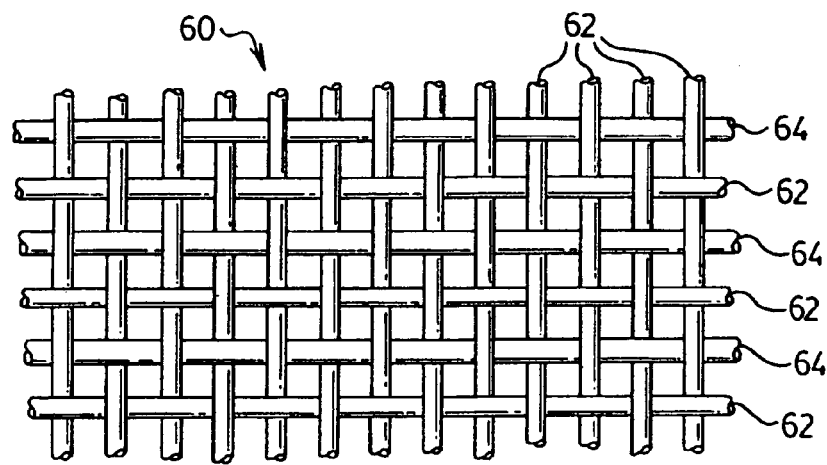
FIG. 14 illustrates another schematic perspective view of the electrically conductive fibers and non-electrically conductive fibers according to an embodiment of the present invention.

As shown, particularly in FIG. 12, sensor 22 is affixed to a surface of a foam element 17 of seat bottom. The nature of how this is accomplished does not particularly restrict it. For example, sensor 22 may be glued to the surface of foam element 17. Alternatively, sensor 22 may be molded into the surface of foam element 17 in a conventional manner. A trim cover 19 is applied over foam element 17 to produce seat bottom 15. When a weight or force is applied to the surface of seat bottom 15 in the direction of arrow A, the compressive force is transmitted to fabric 16 which compresses. This compression results in partial contact between foil 24, electrically conducting strands 64 of fabric 60 and foil 26. This results in a change in conductivity of sensor 22 which can be detected as discussed below. Once the applied weight or force is removed (e.g., the occupant leaves vehicle seat bottom 15 or the occupant shifts his/her weight).

Figure 15:
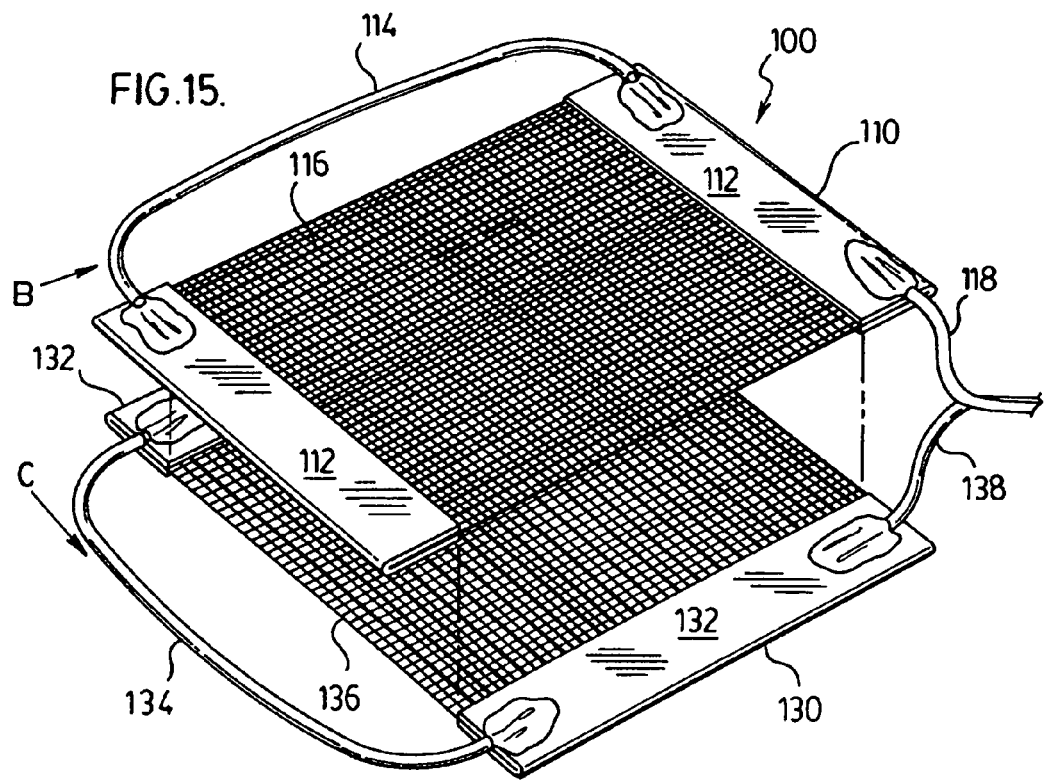
FIG. 15 illustrates an alternate embodiment of the sensor according to the present invention.

With reference to FIGS. 15–18, there is illustrated an alternate embodiment of sensor 22. Thus, FIG. 15 illustrates a sensor 100 comprising a first layer 110 and a second layer 130.

First layer 110 comprises a pair of opposed conductive strips 112 which are interconnected by a lead 114. Disposed between and in contact with strips 112 is a carbonized fabric 116 of the same construction as fabric 60 described above with reference to FIGS. 10–14. In the illustrated embodiment, the electrically conductive fibers in fabric 116 run in the direction of arrow B.

First layer 110 further comprises an electrical lead 118 connected to one strip 112 and a connection bus (not shown).

Second layer 130 comprises the same element as first layer 110 and, for clarity, is labelled such that last digit in the element numbers corresponds to the same last digit of the elements of first layer 110 (for example, in second layer 130, the carbonized fabric is element 136 which is constructed from the same material as fabric 116 of first layer 110).

In the illustrated embodiment, the electrically conducting fibers of fabric 136 run in the direction of arrow C. Thus, the electrically conducting fibers in first layer 110 are disposed transverse, preferably substantially perpendicular, to the electrically conducting fibers in the fabric of second layer 130.

With particular reference to FIGS. 16 and 17, the operation of sensor 100 will now be described. It will be seen that FIGS. 16 and 17 do not illustrate the other components of the vehicle seat (e.g., the foam element, the trim cover, the electrical connections and the like—this is for clarity only).

Thus, FIG. 16 illustrates sensor 100 in the so-called resting state where there is no contact between first layer 110 and second layer 130 (in practice, the weight of these layers may result in there being minimal contact between the layers).

In FIGS. 16 and 17, suffix "a" is to denote an electrically conductive fiber whereas suffix "b" denotes an electrically non-conductive fiber.

In FIG. 16, sensor 110 has a relatively low conductance.

In FIG. 17, a weight or force is applied in the direction of arrows D resulting in more surface area contacts at the junction between first layer 110 and second layer 130. This results in an increase in the conductance of sensor 100 at a constant applied voltage as described above.

Figure 19:
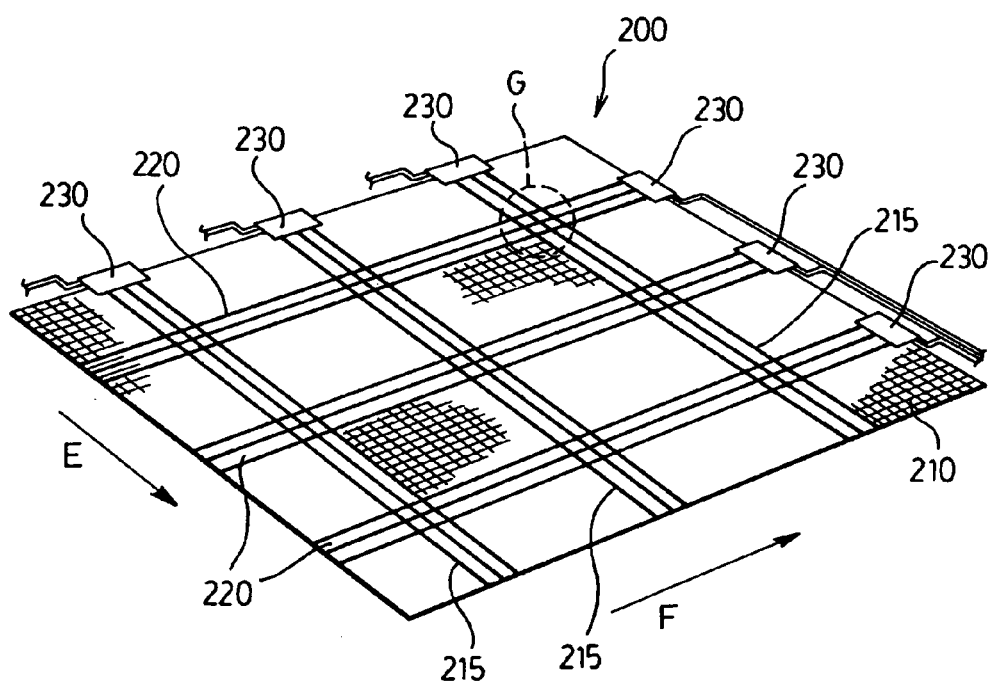
FIG. 19 illustrates yet a further embodiment of the sensor according to the present invention.

With reference to FIG. 19, there is illustrated yet a further embodiment of the present sensor. Thus, there is illustrated a sensor 200 comprising a single mat fabric 210 which is carbonized having the carbon fibers running in the directions of both arrows E and F. Individual fibers 215 are disposed in the direction of arrow E whereas individual fibers 220 are disposed in the direction of arrow F.

In the illustrated embodiment, there are nine crossover regions G where a trio of fibers 215 transverses a trio of fibers 220. This creates a 3×3 matrix of individual sensors on a single fabric mat 210. A series of electrical connections 230 is disposed at the edge of fabric mat 210.

In operation, fabric mat 210 is compressed when a weight or force is applied thereto resulting in increased contact area and increased conductance as discussed above with the previous embodiments.

Figure 20:
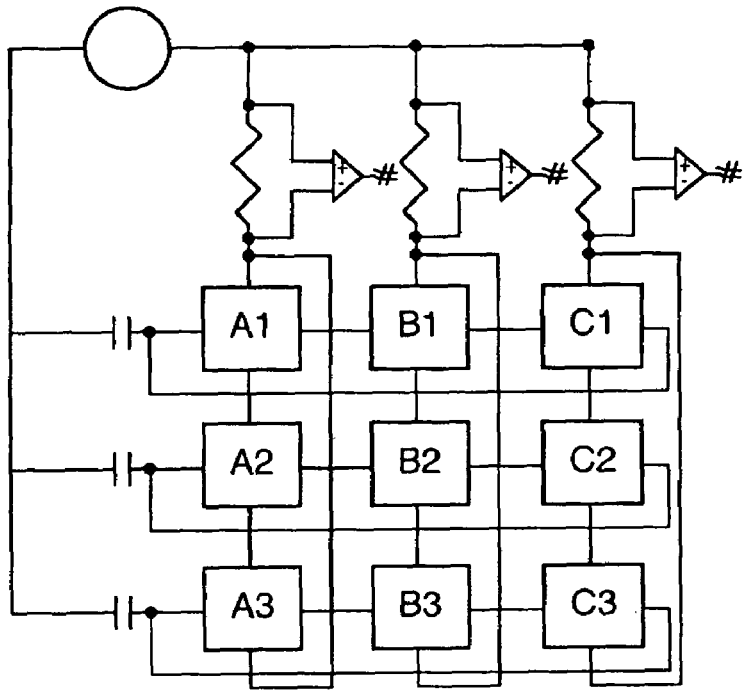
FIG. 20 is a schematic circuit diagram of an embodiment of the present invention particularly well suited for use in a backrest.
Figure 21:
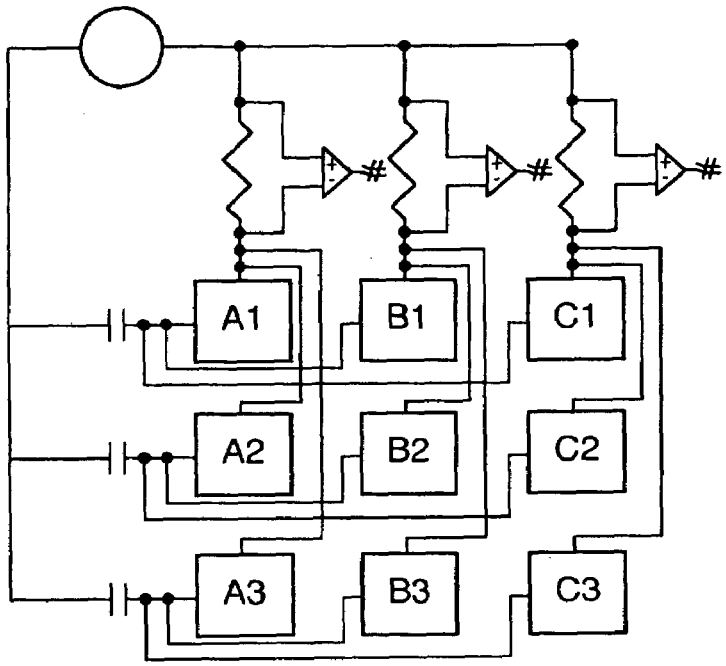
FIG. 21 is a schematic circuit diagram of an embodiment of the present invention particularly well suited for use in a seat bottom.
Figure 22:
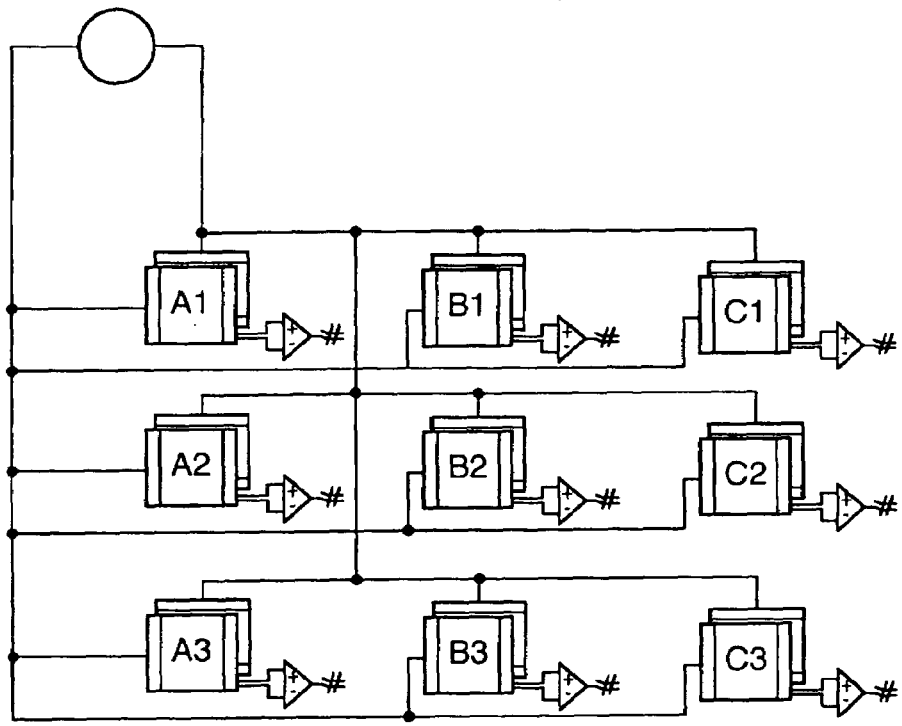
FIG. 22 is a schematic circuit diagram of another useful embodiment of the present invention.

As discussed above, the present sensor allows for detection of a change of conductance between a resting state and an applied force or weight state (e.g., an occupant sitting on the vehicle seat). It is believed that the electronic circuitry to monitor the change in conduction is within the purview of a person of ordinary skill in the art. However, for clarity and illustrative purposes only, a number of embodiments of circuit diagrams for interrogating a 3×3 matrix of sensor elements (any of the embodiments discussed above) are provided in FIGS. 20–23. The circuit shown in FIG. 20 is particularly well suited for use in a backrest. The circuit illustrated in FIG. 21 is particularly well suited for use in a seat bottom. The circuits illustrated in FIGS. 22 and 23 are alternate embodiments which are also useful. Of course, of those of ordinary skill in the art will be able to develop other circuits for interrogating the matrix to detect when a change of conductance has occurred.

By modeling various types and sizes of occupants of vehicle seats, it is possible to generate a database which can be used for comparison with actual conductance measurements taken while the vehicle is in operation to provide information on the nature of the occupant of the vehicle seat. This can then be used to control how or if the airbag should be fired in the event of a collision of the vehicle. Such control measures are conventional in the art.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

I claim:

1. A sensor element comprising a first conductor and a second conductor disposed transversely with respect to the first conductor to define a first junction, wherein at an applied voltage, a first conductance is produced in the absence of applied weight to sensor element and a second conductance is produced in the presence of applied weight to the sensor element, the second conductance being greater than the first conductance.

2. The sensor element defined in claim 1, wherein the first conductor comprises an electrically conductive first fibrous material.

3. The sensor element defined in claim 2, wherein the first fibrous material is comprised in a first woven fabric.

4. The sensor element defined in claim 3, wherein the first woven fabric further comprises an electrically non-conductive first fibrous material.

5. The sensor element defined in claim 1, wherein the second conductor comprises an electrically conductive second fibrous material.

6. The sensor element defined in claim 5, wherein the second fibrous material is comprised in a second woven fabric.

7. The sensor element defined in claim 6, wherein the second woven fabric further comprises an electrically non-conductive second fibrous material.

8. The sensor element defined in claim 1, wherein the first conductor comprises an electrically conductive first fibrous material and the second conductor comprises an electrically conductive second fibrous material.

9. The sensor element defined in claim 8, wherein the first fibrous material is comprised in a first woven fabric and the second fibrous material is comprised in a second woven fabric.

10. The sensor element defined in claim 9, wherein the first woven fabric further comprises an electrically non-conductive first fibrous material and the second woven fabric further comprises an electrically non-conductive second fibrous material.

11. The sensor element defined in claim 9, wherein the first woven fabric and the second woven fabric are comprised of the same material.

12. The sensor element defined in claim 9, wherein the first woven fabric and the second woven fabric are comprised of different materials.

13. The sensor element defined in claim 1, wherein the first conductor comprises an electrically conductive first layer and the second conductor comprises an electrically conductive second layer.

14. The sensor element defined in claim 1, wherein the first conductor comprises an electrically conductive metal first layer and the second conductor comprises an electrically conductive metal second layer.

15. The sensor element defined in claim 13, wherein an electrically conductive fibrous material is interposed between the first layer and the second layer.

16. The sensor element defined in claim 15, wherein the electrically conductive fibrous material is comprised in a woven fabric.

17. The sensor element defined in claim 16, wherein the woven fabric further comprises an electrically non-conductive fibrous material.

18. A foam element comprising at least one sensor element as defined in claim 1.

19. A vehicular element comprising, in combination, a foam element and at least one sensor element as defined in claim 1.

20. A vehicular seat element comprising a foam element having at least one seating surface, the seating surface comprising at least one sensor element as defined in claim 1.

21. A vehicular seat comprising a seat back and a seat bottom, at least one of the seat back and the seat bottom comprising at least one sensor element as defined in claim 1.

22. The vehicular seat defined in claim 21, wherein at least one sensor element is disposed in each of the seat back and the seat bottom.

23. The vehicular seat defined in claim 21, wherein a plurality of sensor elements is disposed in one or both of the seat back and the seat bottom.

24. The vehicular seat defined in claim 21, wherein a plurality of sensor elements is disposed in one or both of the seat back and the seat bottom.

25. The vehicular seat defined in claim 23, wherein the plurality of sensor elements is arranged in an X-Y matrix.

* * * * *